United States Patent
Weber et al.

(10) Patent No.: US 10,938,870 B2
(45) Date of Patent: *Mar. 2, 2021

(54) CONTENT MANAGEMENT ACROSS A MULTI-PARTY CONFERENCING SYSTEM BY PARSING A FIRST AND SECOND USER ENGAGEMENT STREAM AND FACILITATING THE MULTI-PARTY CONFERENCE USING A CONFERENCE ENGINE

(71) Applicant: 8eo, Inc., Troy, VA (US)

(72) Inventors: David Michael Weber, Somerset West (ZA); Lawrence T. Levine, Sarasota, FL (US)

(73) Assignee: 8EO, Inc., Troy, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/854,205

(22) Filed: Apr. 21, 2020

(65) Prior Publication Data
US 2020/0389509 A1    Dec. 10, 2020

Related U.S. Application Data

(63) Continuation of application No. 15/921,556, filed on Mar. 14, 2018, now Pat. No. 10,673,913.

(51) Int. Cl.
| | | |
|---|---|---|
| *H04L 29/06* | (2006.01) | |
| *G10L 15/26* | (2006.01) | |
| *H04L 29/08* | (2006.01) | |

(52) U.S. Cl.
CPC ........ *H04L 65/4053* (2013.01); *H04L 65/403* (2013.01); *H04L 65/605* (2013.01); *G10L 15/26* (2013.01); *H04L 67/1097* (2013.01)

(58) Field of Classification Search
CPC . H04L 65/4053; H04L 65/403; H04L 65/605; H04L 67/1097; G10L 15/26; G10L 15/256
See application file for complete search history.

(56) References Cited

U.S. PATENT DOCUMENTS

| | | | | |
|---|---|---|---|---|
| 5,668,863 | A * | 9/1997 | Bieselin | H04M 3/56 379/202.01 |
| 5,710,591 | A * | 1/1998 | Bruno | H04M 3/42221 348/14.06 |
| 5,915,091 | A * | 6/1999 | Ludwig | G06Q 10/10 348/E7.081 |
| 6,298,129 | B1 * | 10/2001 | Culver | H04M 3/42153 379/202.01 |

(Continued)

*Primary Examiner* — Daniel C. Murray
(74) *Attorney, Agent, or Firm* — Bechen PLLC; Timothy J. Bechen

(57) ABSTRACT

A system and method provides for content management for a networked communication platform, including receiving a communication connection with a user, such as via a networked connection. The method and system includes a communication platform having executable operations for facilitating a multi-party conference with a conference engine that receives both an audio/video stream from the user, as well as data relating to the user interface operations. Concurrently, the data stream and the audio/video stream are transmitted to a data engine. The facilitates an online conference with two more users, the data engine processes the feeds external from the conference itself, allowing for recordation.

8 Claims, 5 Drawing Sheets

(56) References Cited

U.S. PATENT DOCUMENTS

| | | | | |
|---|---|---|---|---|
| 6,334,022 B1* | 12/2001 | Ohba | G11B 27/28 | 386/231 |
| 6,349,303 B1* | 2/2002 | Saito | H04N 7/15 | |
| 6,377,995 B2* | 4/2002 | Agraharam | H04L 29/06027 | 709/231 |
| 6,529,602 B1* | 3/2003 | Walker | H04K 1/00 | 379/67.1 |
| 6,704,769 B1* | 3/2004 | Comstock | H04N 7/147 | 348/E7.081 |
| 6,816,904 B1* | 11/2004 | Ludwig | H04M 3/567 | 348/E7.081 |
| 6,839,417 B2* | 1/2005 | Weisman | H04M 3/42008 | 379/204.01 |
| 6,967,672 B1* | 11/2005 | Huber | H04N 7/147 | 348/14.08 |
| 7,039,585 B2* | 5/2006 | Wilmot | G10L 15/26 | 704/235 |
| 7,043,528 B2* | 5/2006 | Schmitt | H04N 7/152 | 348/E7.084 |
| 7,362,349 B2* | 4/2008 | Nelson | H04N 7/147 | 348/14.08 |
| 7,398,267 B2* | 7/2008 | Fenton-Jones | G06Q 50/165 | |
| 7,426,192 B2* | 9/2008 | Amano | G06Q 30/02 | 370/260 |
| 7,466,334 B1* | 12/2008 | Baba | G11B 27/034 | 348/14.06 |
| 7,499,075 B2* | 3/2009 | Miceli | H04N 7/147 | 348/14.08 |
| 7,548,951 B2* | 6/2009 | Nagayama | G11B 16/685 | 704/235 |
| 7,730,407 B2* | 6/2010 | Chiu | G06F 16/40 | 715/732 |
| 7,817,180 B2* | 10/2010 | Jeong | H04N 7/147 | 348/14.08 |
| 7,861,088 B1* | 12/2010 | Brothers | H04L 9/3297 | 713/178 |
| 7,870,192 B2* | 1/2011 | Greenlee | H04L 65/4046 | 709/204 |
| 8,099,461 B2* | 1/2012 | Matsukawa | H04L 12/66 | 709/204 |
| 8,189,030 B2* | 5/2012 | Ivashin | H04L 12/1831 | 348/14.08 |
| 8,203,592 B2* | 6/2012 | Nelson | H04N 7/15 | 348/14.08 |
| 8,289,360 B2* | 10/2012 | Kim | H04N 21/2368 | 348/14.02 |
| 8,312,081 B2* | 11/2012 | Yuan | H04L 67/22 | 709/204 |
| 8,428,227 B2* | 4/2013 | Angel | H04M 3/42221 | 379/68 |
| 8,438,131 B2* | 5/2013 | Prorock | G11B 27/36 | 707/634 |
| 8,456,507 B1* | 6/2013 | Mallappa | H04N 7/152 | 348/14.08 |
| 8,487,978 B2* | 7/2013 | Huang | H04L 65/403 | 348/14.09 |
| 8,547,880 B2* | 10/2013 | Yoakum | H04M 3/568 | 370/260 |
| 8,682,973 B2* | 3/2014 | Kikin-Gil | H04L 65/4015 | 709/204 |
| 8,786,667 B2* | 7/2014 | Shanmukhadas | H04N 7/15 | 348/14.08 |
| 8,812,510 B2* | 8/2014 | Romanov | G06F 16/2272 | 707/746 |
| 8,825,478 B2* | 9/2014 | Cox | G10L 15/26 | 704/235 |
| 8,862,473 B2* | 10/2014 | Shinnishi | G10L 15/18 | 704/270 |
| 8,887,067 B2* | 11/2014 | Tripathi | G06F 3/0481 | 715/753 |
| 8,903,905 B2* | 12/2014 | Cadou | H04L 65/1083 | 709/204 |
| 8,972,262 B1* | 3/2015 | Buryak | G10L 15/28 | 704/251 |
| 9,002,938 B2* | 4/2015 | Bank | H04L 12/1822 | 709/204 |
| 9,087,521 B2* | 7/2015 | Reynolds | G11B 27/005 | |
| 9,118,654 B2* | 8/2015 | Anderson | H04M 3/56 | |
| 9,179,100 B2* | 11/2015 | Guo | H04N 7/152 | |
| 9,224,390 B2* | 12/2015 | Alkov | G10L 15/1822 | |
| 9,288,278 B2* | 3/2016 | Panje | H04L 67/2804 | |
| 9,392,037 B2* | 7/2016 | Hyndman | H04M 3/42221 | |
| 9,495,967 B2* | 11/2016 | Singh | G10L 17/22 | |
| 9,553,982 B2* | 1/2017 | Unitt | H04L 63/12 | |
| 9,560,206 B2* | 1/2017 | Jones | H04M 3/56 | |
| 9,601,117 B1* | 3/2017 | Pettay | H04M 3/42221 | |
| 9,602,295 B1* | 3/2017 | Weiner | H04L 12/1822 | |
| 9,609,277 B1* | 3/2017 | Chen | G11B 27/28 | |
| 9,692,842 B2* | 6/2017 | Grant | H04L 12/1831 | |
| 9,767,807 B2* | 9/2017 | Bhaskaran | G07C 9/25 | |
| 9,923,982 B2* | 3/2018 | FitzGerald | H04L 65/605 | |
| 9,996,241 B2* | 6/2018 | Kikin-Gil | G06F 9/451 | |
| 10,044,872 B2* | 8/2018 | Guo | H04M 3/566 | |
| 10,057,707 B2* | 8/2018 | Cartwright | H04S 7/303 | |
| 10,148,910 B2* | 12/2018 | Mercredi | H04N 7/155 | |
| 10,277,953 B2* | 4/2019 | Engineer | H04N 21/4884 | |
| 2003/0174830 A1* | 9/2003 | Boyer | H04M 3/51 | 379/265.02 |
| 2003/0187632 A1* | 10/2003 | Menich | H04L 65/4038 | 704/1 |
| 2004/0119814 A1* | 6/2004 | Clisham | H04N 21/440281 | 348/14.08 |
| 2004/0207724 A1* | 10/2004 | Crouch | H04L 65/4038 | 348/14.09 |
| 2005/0018622 A1* | 1/2005 | Halbraich | H04L 43/00 | 370/260 |
| 2005/0132412 A1* | 6/2005 | Richardson | H04L 65/403 | 725/100 |
| 2006/0146124 A1* | 7/2006 | Pepperell | H04N 21/4334 | 348/14.08 |
| 2007/0112926 A1* | 5/2007 | Brett | G06Q 10/109 | 709/206 |
| 2007/0230444 A1* | 10/2007 | Williams | H04L 65/1023 | 370/352 |
| 2008/0059581 A1* | 3/2008 | Pepperell | H04L 12/1827 | 709/204 |
| 2008/0072159 A1* | 3/2008 | Cockerton | H04L 65/1083 | 715/756 |
| 2008/0316298 A1* | 12/2008 | King | H04N 7/152 | 348/14.09 |
| 2009/0306981 A1* | 12/2009 | Cromack | G06F 16/685 | 704/235 |
| 2010/0042647 A1* | 2/2010 | Schultz | H04N 21/8146 | 379/85 |
| 2011/0261142 A1* | 10/2011 | Shanmukhadas | H04N 7/155 | 348/14.1 |
| 2011/0286584 A1* | 11/2011 | Angel | G10L 15/26 | 379/88.02 |
| 2012/0053936 A1* | 3/2012 | Marvit | G10L 17/10 | 704/235 |
| 2012/0079130 A1* | 3/2012 | Lv | H04L 65/1073 | 709/231 |
| 2012/0224021 A1* | 9/2012 | Begeja | H04N 7/155 | 348/14.08 |
| 2012/0274730 A1* | 11/2012 | Shanmukhadas | H04N 7/152 | 348/14.08 |
| 2012/0274731 A1* | 11/2012 | Shanmukhadas | H04L 12/1831 | 348/14.08 |
| 2012/0296914 A1* | 11/2012 | Romanov | H04N 7/147 | 707/741 |
| 2013/0027509 A1* | 1/2013 | Ranganath | H04N 7/15 | 348/14.09 |
| 2013/0070045 A1* | 3/2013 | Meek | G06F 3/0482 | 348/14.07 |
| 2013/0155179 A1* | 6/2013 | Corley | H04L 65/00 | 348/14.08 |
| 2015/0181166 A1* | 6/2015 | Kao | H04N 7/152 | 348/14.09 |

(56) References Cited

U.S. PATENT DOCUMENTS

2017/0034261 A1* 2/2017 Garrison ............. H04L 12/2812
2018/0352268 A1* 12/2018 O'Hanlon ............. H04L 67/104
2019/0179595 A1* 6/2019 De Angelis ........... G06F 16/639

* cited by examiner

CONTENT MANAGEMENT ACROSS A MULTI-PARTY CONFERENCING SYSTEM BY PARSING A FIRST AND SECOND USER ENGAGEMENT STREAM AND FACILITATING THE MULTI-PARTY CONFERENCE USING A CONFERENCE ENGINE

RELATED APPLICATIONS

The present application is a continuation of and claims priority to U.S. patent application Ser. No. 15/921,556 entitled "CONTENT MANAGEMENT ACROSS A MULTI-PARTY CONFERENCE SYSTEM BY PARSING A FIRST USER AND A SECOND USER ENGAGEMENT STREAM AND TRANSMITTING THE PARSED FIRST USER AND SECOND ENGAGEMENT STREAM TO A CONFERENCE ENGINE AND A DATA ENGINE FROM A FIRST AND SECOND RECEIVER" filed Mar. 14, 2018.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF INVENTION

The disclosed technology relates generally to multi-party communication systems, such as teleconferencing communication systems, and more specifically to software and hardware for managing content generated by multiple parties engaging the communication system.

BACKGROUND

There are well known and established conference call technologies allowing multiple parties to engage in audio (and video) communications across various networks. With enhanced communication protocols and transmission bandwidths, it is very common to engage in audio/video communication using a computer or a smart phone. There are also technological improvements allowing for any number of participants to these calls or sessions.

Existing conferencing technology typically operates through parties engaging a central platform. Users connect to this platform, the platform then generates an output stream of the other users all within the single conference. This content centralization, while efficient with existing platform techniques, limits the ability to manage individual user content streams and data generated from those individual streams.

For instance, all the inputs are simply fed into the communication platform, lacking the ability to specifically track and manage user-specific input/output.

U.S. Pat. No. 9,672,829 describes a video conferencing system that manages the conference and allows for recording specific points in the conference. This prior art system illustrates the common technique of queueing all users into the platform to generate a platform feed. The platform then centrally manages the single feed, lacking the ability to manage a single user feed independent of the platform feed.

It is also known to engage ancillary features to peer-to-peer communication. U.S. Pat. No. 7,861,088 relates to telephone connections, describing a user verification step prior to connecting parties, and then allowing for recordation of the call. The user verification uses a separate service provider to verify the user and once verified, the accesses the public. The U.S. Pat. No. 7,861,088 includes the ability to record conversations having at least one party verified, but is limited by operating outside of a conferencing platform.

With network conferencing systems, there is a need to better manage user data feeds, including independent management of the feeds. There is also a need for better retention and content verification for these feeds.

BRIEF DESCRIPTION

A system and method provides for content management for a networked communication platform. The method and system includes a communication platform that receives a user engagement stream from a user, such as via a networked connection. The communication platform having executable operations for facilitating a multi-party conference and allowing recordation of portions of the conference call, such as recordation of extracted utterances or other interactivities.

Each user engagement stream is received a separate receiver, which parses the user engagement stream into separate content feeds, such as an audio feed, a video feed, and a data feed. The system and method includes a conference engine that receives the user engagement stream, as well as a data engine that also receives the user engagement stream.

During operation, the conference engine executes executable instructions for facilitating an online video and/or audio conference with two more users. In addition to the conference, the data engine is operative to process the data and audio/video feeds external from the conference itself. During operation, the data engine can then selectively record portions of the conference in response to a store command from the conference engine. Recording can be one or more feeds instead of the full conference storage.

The conference engine may engage the data engine for providing conference data. This conference data may be included with any recordings, where conference data is data relating to the multi-party conference being conducted by the conference engine.

Furthermore, while the conference engine and the data engine are within the communication platform, any number of external data engines may be utilized for further functionality as described herein.

By receiving user engagement streams prior to the conference engine and distributing the engagement stream to both the conference engine and the data engine, the method and system allows for improved functionality of the engagement stream above and beyond mere multi-party conferencing. The isolation of user engagement streams allows for specific recording and other functions for individual parties of the conference, including recording and verifying in-conference audio, video, and/or data. The parsed streams allows for the data engine to record any variety of streams, including streams indicating a user's perspective. The conference engine provides meta data that can also be used to indicate session-specific information, usable for determining each user perspective and enabling a proper and accurate recreation of the conference call from any and all perspectives.

The method and system may additionally use a distributed ledger storage system for validating recorded content feed(s)

parsed from the user engagement stream(s). The distributed ledger allows for independent verification of the reliability of the stored content, further verifying the interactions and the content having occurred during the multi-party conference call.

BRIEF DESCRIPTION OF THE DRAWINGS

A better understanding of the disclosed technology will be obtained from the following detailed description of the preferred embodiments taken in conjunction with the drawings and the attached claims.

DETAILED DESCRIPTION

Various embodiments are described herein, both directly and inherently. However, it is understood that the described embodiments and examples are not expressly limiting in nature, instead illustrate examples of the advantageous uses of the innovative teachings herein. In general, statements made in the specification of the present application do not necessarily limit any of the various claimed inventions and it is recognized that additional embodiments and variations recognized by one or more skilled in the art are incorporated herein.

Figure 1:
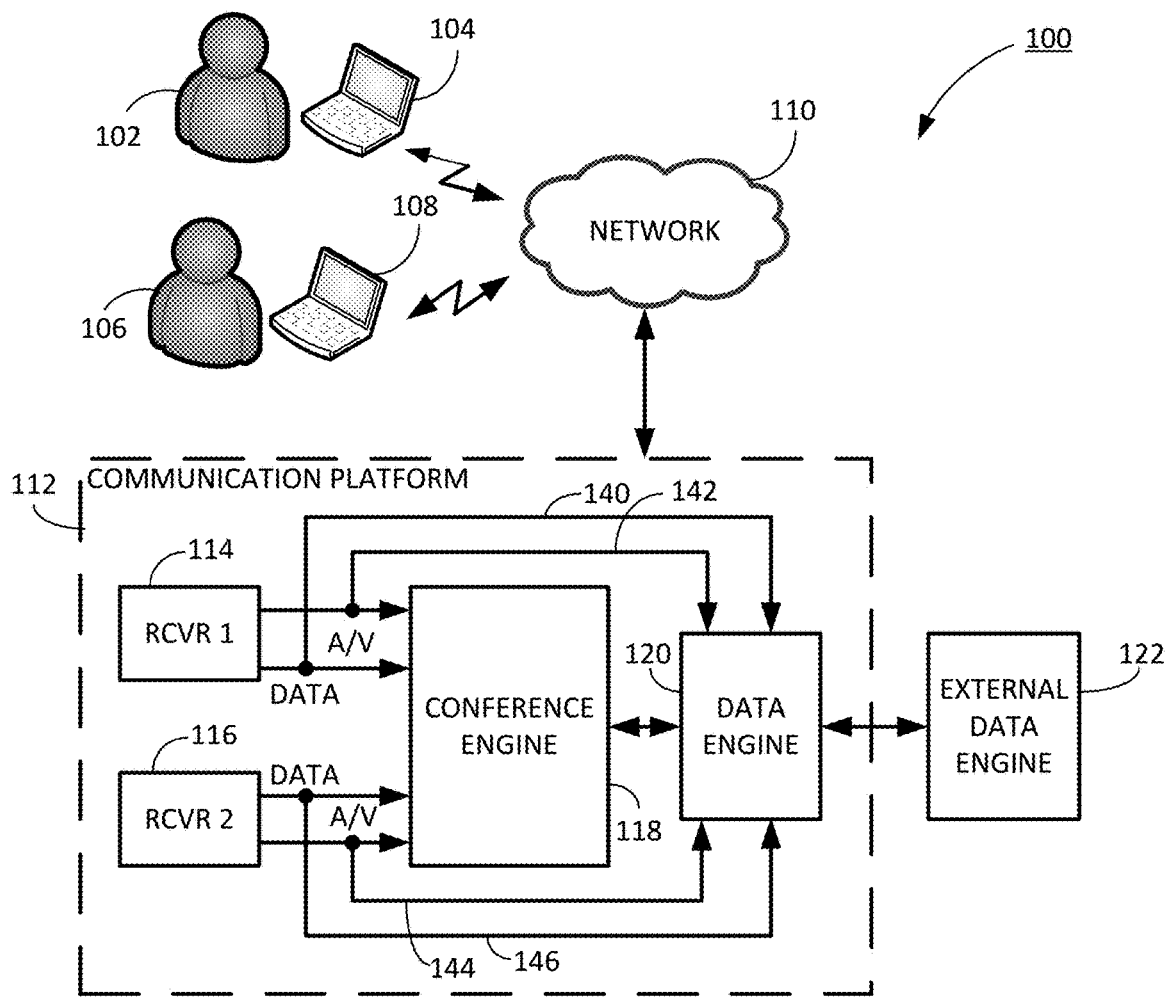
FIG. 1 illustrates one embodiment of a processing system allowing for multi-party communication.

FIG. 1 illustrates a processing system 100 allowing for content management of a conferencing system. The system 100 includes a first user 102 with a first computing device 104 and a second user 106 with a second computing device 108. The system includes network 110 and communication platform 112.

The communication platform 112 includes a first receiver 114 and second receiver 116, as well as a conference engine 118 and a data engine 120. The system 100 further includes an external data engine 122.

The users 102 and 106 may be any suitable user or users accessing the communication platform 112 via computing devices 104, 108 respectively. For example, the users 102, 106 may be individual users using a camera and/or a microphone for generating video and/or audio input. The computing device 104 (as well as device 108) may be any suitable device or devices enabling communication with the platform 112. For example, the device 104 may be laptop or desktop computer including a display screen, video camera and a microphone. In another example, the device 104 may be a smartphone, tablet computer or other mobile device having input and output components, such as a microphone, camera, speaker, display, keypad, touchpad, etc. The device 104 (as well as device 108) may be any other suitable computing device or devices, such as a conferencing system including a video conference system, a telephone conferencing system, a television, set-top box, gaming device, or any other computer system or systems providing for user input and output, as well as connectivity to the network 110. Moreover, the device 104, 108 may be a plurality of computing devices, such as a phone for audio and a computer with a webcam for video.

The network 110 may be any suitable network, including a private or public network, such as a virtual private network, an intranet, the Internet. While not expressly illustrated, it is recognized that the network 110 may include additional computing resources allowing for networked communication. For example, if the computing device 104 is a mobile device connecting via a wireless network, the network 110 would include routers, servers and other known technology for connecting the device 104 to the platform 112. In another example, if the computing device 104 connects via a cellular or telephone network, handoff or other known technology may bridge to the network 110.

The communication platform 112 is a network-accessible device or devices enabling the functionality described herein. The platform 112 may be a single processing system or may be in a distributed processing system with executable operations performed across multiple locations. The platform 112 includes functionality executed by computer processing device(s) and/or system(s) in response to executable instructions.

The first receiver 114 and second receiver 116 may be any suitable processing device(s) operative to receive incoming user engagement streams having content feed(s), parsing the feed(s) as necessary and distributing the feed(s) within the platform 112. The conference engine 118 is one or more processing devices performing processing operations enabling multi-party conferencing as described herein. The conference engine 118 additionally generates conference data including meta data relating to the actions and events occurring during a conference. The conference engine 118 operates using independent content feeds from receivers 114, 116.

The data engine 120 is one or more processing devices operative to perform data management and storage operations on the content from receivers 114, 116 and in response to instructions, and conference data, from the conference engine 118. The data engine 120 may include internal storage. In other embodiments, the external data engine 122 may provide external storage operations. For example, the external data engine 122 may be a distributed ledger system enabling storage of reference hash referring to stored conference data in a block chain format, as described in further detail below.

During operations, the system 100 allows for multi-party communication via the conference engine 118. While FIG. 1 illustrates the first user 102 and second user 106, it is recognized that any suitable number of users may be engaged across the network and the system 100 is not restricted to two users. For each different user, there is a unique receiver managing the user engagement stream including data input and output feeds. Furthermore, varying embodiments may utilize multiple receivers for individual users as necessary. In one embodiment, a user may engage the communication platform using two different input/output means, e.g. a video conference for video data, an audio feed engine for audio data, and an online document sharing portal for data.

The users 102 and 106 engage the platform 112 using any suitable engagement technique, including for example logging in using verifiable credentials, dialing in via an established number or identifier, selecting a hyperlink, engaging an app, etc.

The receiver 114 in the communication platform 112 provides unique conferencing functionality for the platform 112, as well as benefits to user 102. Instead of a full user engagement stream being directly received by the conference engine 118, the receiver 114 splits out the content stream into its components.

Figure 2:
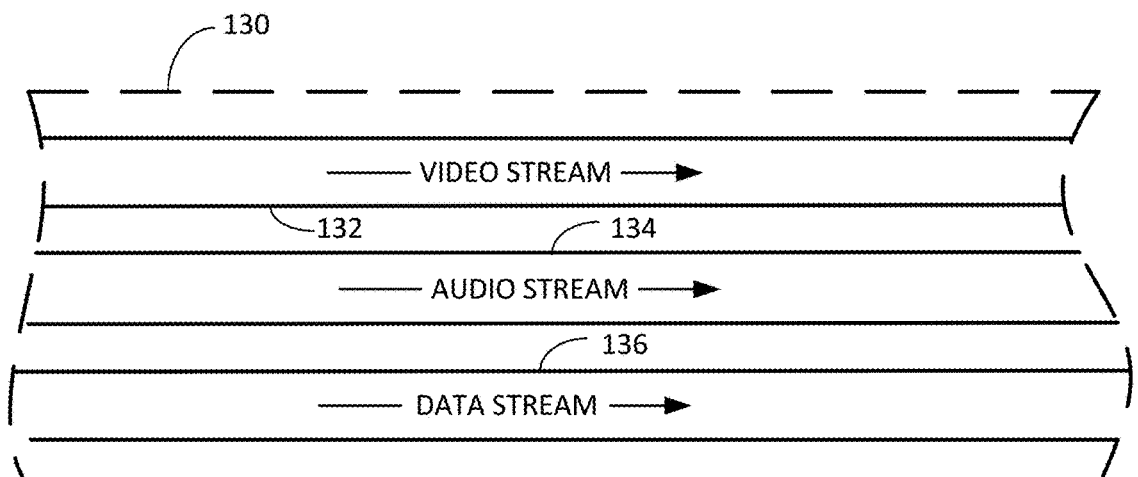
FIG. 2 illustrates an exploded view of one embodiment of an incoming user engagement stream.

For example, FIG. 2 illustrates a graphical representation of a user engagement stream 130 received by the communication platform 112 across the network 110 in FIG. 1. In this embodiment, the stream 130 includes three components: a video stream 132; an audio stream 134; and a data stream 136. Where these streams are representative examples of types of streams, it is recognized that other streams may be utilized or complimented, such as by way of example, a first video stream and second video stream with the first video stream focusing on a user's face and the second stream on presentation.

With reference back to FIG. 1, the first receiver 114 receives the user engagement stream and parses out its components. FIG. 1 illustrates an example of a first audio/video stream 140 and a first data stream 142. The second receiver parses the second audio/video stream 144 and a second data stream 146. While not expressly illustrated, the first receiver 114 receives its first user engagement stream from the first user 102 and the second receiver 116 receives its second user engagement stream from the second user 106.

The first receiver 114 transmits the streams 140, 142 to conference engine 118 and to the data engine 120. Where prior conferencing systems merged all streams first in a conferencing engine, the receiver 114 parsing the streams 140, 142 improves functionality within the conference engine 118 and the data engine 120.

The conference engine 118 performs processing operations to facilitate conferencing functions using the streams 140, 142, 144 and 146. The streams are merged to join all elements within a single multi-party conference, including generating output streams as requested by users. For example, in a video conference with multiple parties, a user may request a video output of selected speakers or toggle between users when different users are recognized as speaking. In other embodiments, the output may include multiple output screens for each of the conference users.

In one embodiment, the conference engine 118 may perform conferencing operations using systems and method described in U.S. Pat. No. 9,774,639, which is incorporated by reference herein. The interactions and user settings are represented as conference data. For example, for a three-party conference with users, User A, User B, and User C, the conference data includes any or all information relating to the interactivities and engagements of the users, such as which party has input volume muted, output volume muted, a display screen active, a camera active, etc.

In addition to the audio/video feed 140, the data stream 142 can represent data content associated with the conference. For example, if a user is presenting multiple slides or electronic documents, this content can be within the data stream 142. Another type of data may be a video feed, such as a movie and animation. Content feed may also be text message(s) exchanged via the platform, for example chat data between one or more parties. Another example may be screenshots, such as a screen capture of a user's display to verify what output is visible to the user. The conference engine 118 can merge this as part of the conference input/output for participants.

In addition to the conference engine 118 providing multi-party conferencing features, the data engine 120 enables recordation and management of the conference stream(s). The data engine 120 remains in communication with the conference engine 118 allowing for further accuracy in stream management. The conference engine 118 can generate a store a command to the data engine. This store command provides an instruction to store a segment of the conference. This stored command may include any variety of storage options, including which user streams to store, duration of storage, conference data included, etc. In one embodiment, a user interface operating via the conference engine allows for a user to actively select a record option, generating and transmitting a store command to the data engine.

The conference engine 118 generates the conference data indicating interactivity within the conference itself, such as indicating which parties are actively muted, which parties are speaking, which parties are sharing data, etc. This conference data may include moderator instructions for the conference, including control instructions for input/output for the users, as well as controls for recordation of content by the data engine 120.

The data engine 120 processes the streams, e.g. stream 140, 142, 144 and 146, for recordation, either locally within the platform 112 or external the external data engine 122. Recordation is done in response to the store command from the conference engine 118. As the streams have been parsed out separately prior to the conference engine 118, the data engine 120 may then store one or more streams independent of the conference itself and independent of other streams.

The data engine 120 therefore allows for content recordation outside of the conference call itself. The data engine 120 may record one or more elements, e.g. streams, that make up the conference call without interfering with the conference engine 118 or relying on the all-user data set processed by the conference engine 118. For example, as described in greater detail below, the storage could be selected content feeds and conference data, which allows for later recreation of the conference itself.

Where content is stored external to the platform, the external data engine 122 operates similar to the data engine 120 allowing for networked data storage. As described in further detail below, the external data engine may allow for centralized database storage or distributed ledger storage.

The conference engine 118, as part of its operation for generating and moderating the conference, combines the data feeds and generates output signals for the receivers 114, 116 to transmit back to the devices 104, 108. The engine 118 may further interact with the data engine 120 for verification of recordation or generation of additional information as part of the conference. For example, in one embodiment if the data feed includes a document seeking validation by conference members, and all parties electronically validate through a user interface, the conference engine 118 can generate a verification command to the data engine 120 as part of the conference data. As described in further detail below, addition embodiments are within the scope, where from a general operational flow, the data engine 120 can directly record content as well as interact with the conference engine 118 for improving the conference features.

The conference engine 118 operates to provide a multi-party conferencing system for the plurality of users, as well as facilitate recording stream data and conference data by the data engine. The platform 112 including the data engine 120 allows for not only real-time multi-party communication, but storage of the feeds, and enabling full conference content verification at a later point in time by allowing for recreation of the conference itself from the stored stream data and the conference data.

Figure 3:
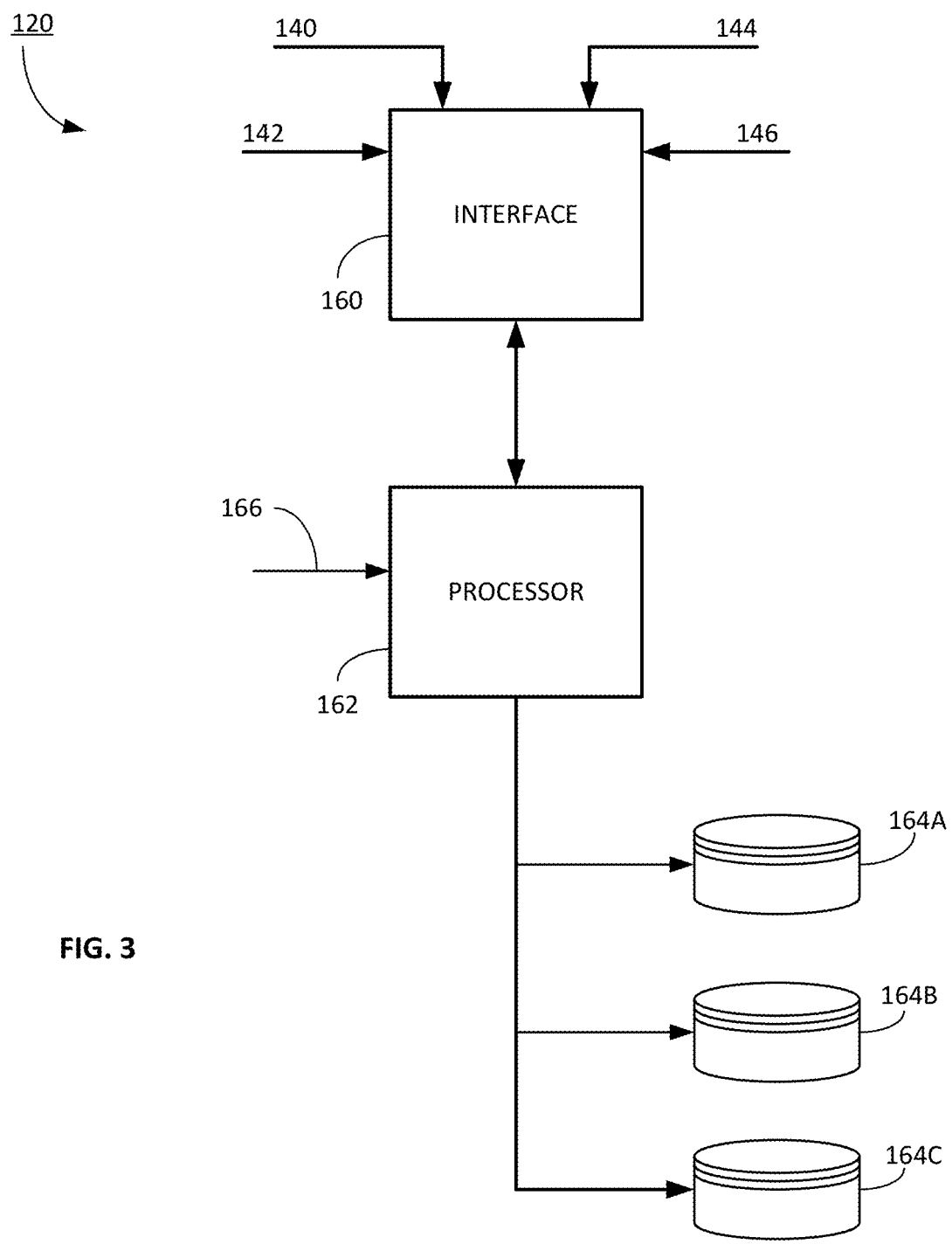
FIG. 3 illustrates an exploded view of one embodiment of the data engine.

FIG. 3 illustrates one embodiment of the data engine 120 including an interface 160, a data processor 162, and a plurality of storage devices 164. The interface 160 receives the feeds 140, 142, 144 and 146, as well as interfacing with the conference engine to receive a store command and conference data 166. The processor 162 performs processing operations for the recordation of one or more of the feeds 140-146. The feeds in FIG. 3 illustrate four exemplary feeds, but it is recognized that any number of feeds are received therein, where the number of participants can increase the number of feeds.

The interface 160 and the processor 162 operate in response to executable instructions and may be local or distributed processing. The processor 162, in addition to the storage operations, manages location storage including storage location identifiers. The processor 162 may also include encryption technology for securing the privacy of the data. The processor 162 may further include operations enabling verification of the authenticity of the data, such as using a distributed ledger storage technique with a merkle tree hash-based data structure associated therewith. In the example of a distributed ledger, the processor 162 may generate and maintain hashing algorithms enabling the proper storage operations or may coordinate with third-party processing engine(s) for hash value generation and verification.

For example, the storage may interact with a ledger network to achieve full validation. Where the conference data and feed data is stored, the system may send an apex, a sub node or a Merkle tree to the distributed ledger. The validation data, which in this example may be a Merkle hash, are written to the distributed, where the nature of the distributed ledger validates authenticity of the conference data and the feed data. For example, one technique may include using the generation and validation described in U.S. Pat. No. 4,309,569 entitled "Method of Providing Digital Signatures."

Data storage elements 164 may be local storage or distributed storage. The processor 162 encapsulates the data from the feeds 140-146 as instructed by the data engine. The processor 162 may include additional processing or conference data included with the feed data, such as for example meta data relating to the conference, information about the user or users on the conference, or other any suitable information relating to the multi-party conference.

Regarding storage of the feed data, the storage may be local or external. Storage may include a centralized database storage system as illustrated in FIG. 4 or a distributed ledger system of FIG. 5.

The block chain database is a decentralized block chain configuration that ensures accurate mapping of conference data. A block chain configuration may be used to maintain an accurate ledger of feed recordation over time and to provide validation stored content. The block chain database maintains a list of data records, such as real-time and on-going list of conference data associated with the recordings. A block chain typically includes several nodes, which may be one or more systems, machines, computers, databases, data stores or the like operably connected with one another.

Figure 4:
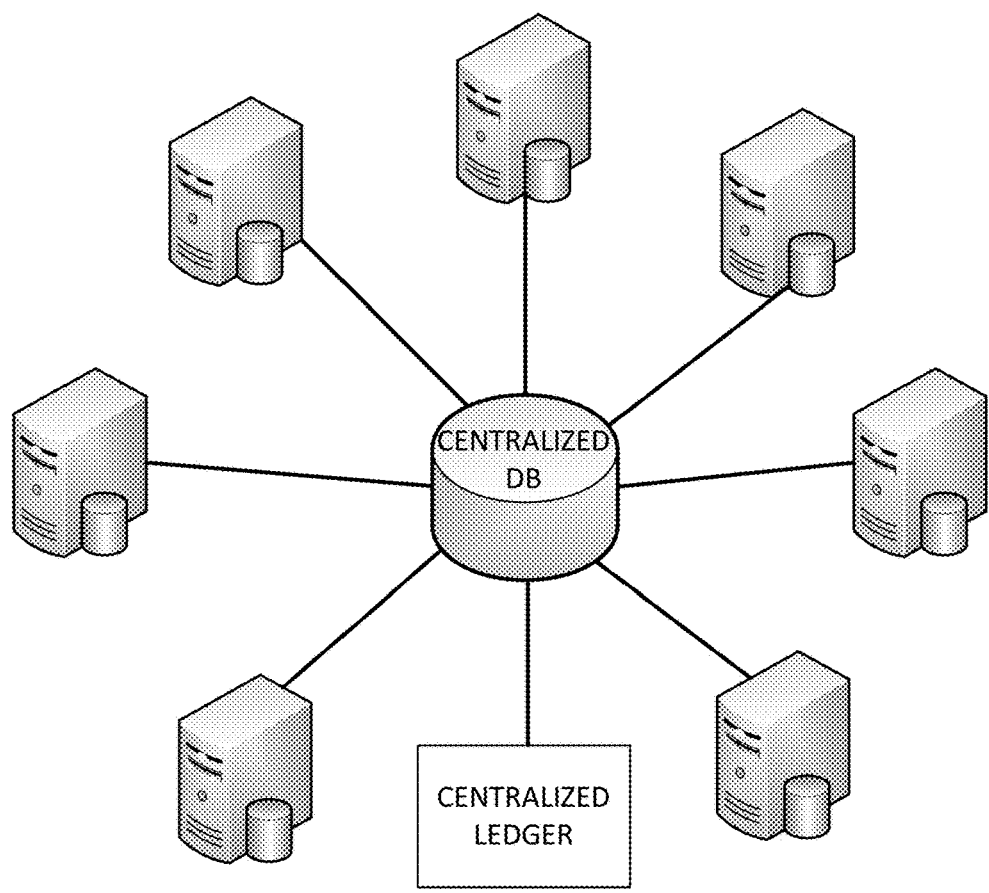
FIG. 4 illustrates one embodiment of a data storage system for storing user engagement data.

FIG. 4 illustrates a centralized database architecture environment, in accordance with one embodiment of the present invention. The centralized database architecture comprises multiple nodes from one or more sources and converge into a centralized database. The system, in this embodiment, may generate a single centralized ledger for data received from the various nodes.

Figure 5:
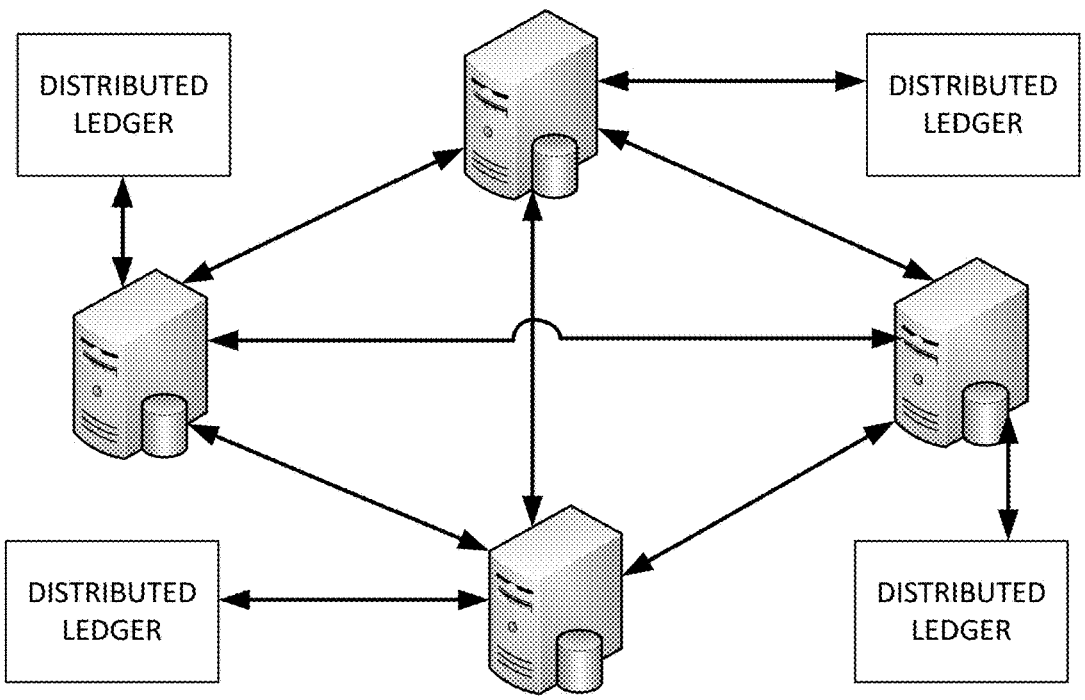
FIG. 5 illustrates another embodiment of a data storage system for storing user engagement data.

FIG. 5 illustrates a block chain system environment architecture, in accordance with one embodiment of the present invention. Various embodiments of the invention may use a decentralized block chain configuration or architecture as shown in FIG. 5 in order to facilitate storage and verification of the authenticity of stored content.

A block chain or Blockchain is a distributed database that maintains a list of data records, such as real-time conference identifications, the security of the veracity of the stored information is enhanced by the distributed nature of the block chain. A block chain typically includes several nodes, which may be one or more systems, machines, computers, databases, data stores or the like operably connected with one another. In some cases, each of the nodes or multiple nodes are maintained by different entities. A block chain typically works without a central repository or single administrator. One well-known application of a block chain is the public ledger of transactions for cryptocurrencies. The data records recorded in the block chain are enforced cryptographically and stored on the nodes of the block chain.

A block chain provides numerous advantages over traditional databases. A large number of nodes of a block chain may reach a consensus regarding the validity of a transaction, or in this embodiment insuring the validity of the content from the conference call.

The block chain system typically has two primary types of records. The first type is the transaction type, which consists of the actual data stored in the block chain. The second type is the block type, which are records that confirm when and in what sequence certain transactions became recorded as part of the block chain. Transactions are created by participants using the block chain in its normal course of business and blocks are created by users known as "miners" who use specialized software/equipment to create blocks. Users of the block chain create transactions that are passed around to various nodes of the block chain. A "valid" transaction is one that can be validated based on a set of rules that are defined by the particular system implementing the block chain.

In FIG. 5, a block chain system is typically decentralized—meaning that a distributed ledger (i.e., a decentralized ledger) is maintained on multiple nodes of the block chain. One node in the block chain may have a complete or partial copy of the entire ledger or set of transactions and/or blocks on the block chain. Here, the transactions include information relating to the events undertaken during the multi-party conference call as noted by the feeds and conference engine. Transactions are initiated at a node of a block chain and communicated to the various nodes of the block chain. Any of the nodes can validate a transaction, add the transaction to its copy of the block chain, and/or broadcast the transaction, its validation (in the form of a block) and/or other data to other nodes. This other data may include time-stamping, allowing for authenticity verification of the stored content.

Figure 6:
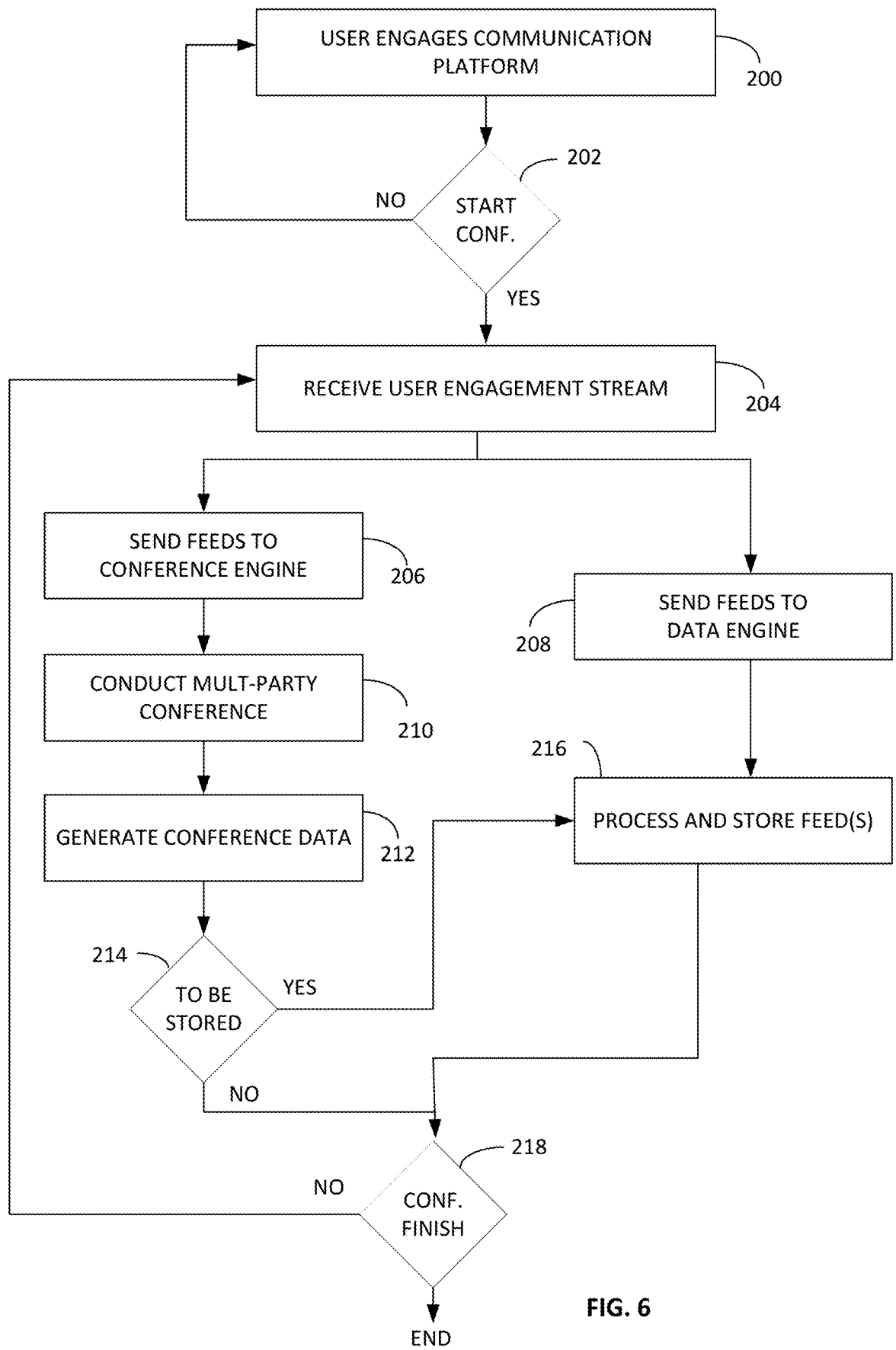
FIG. 6 illustrates a flowchart of the steps of one embodiment of a method for content management in a multi-party communication system.
Figure 7:
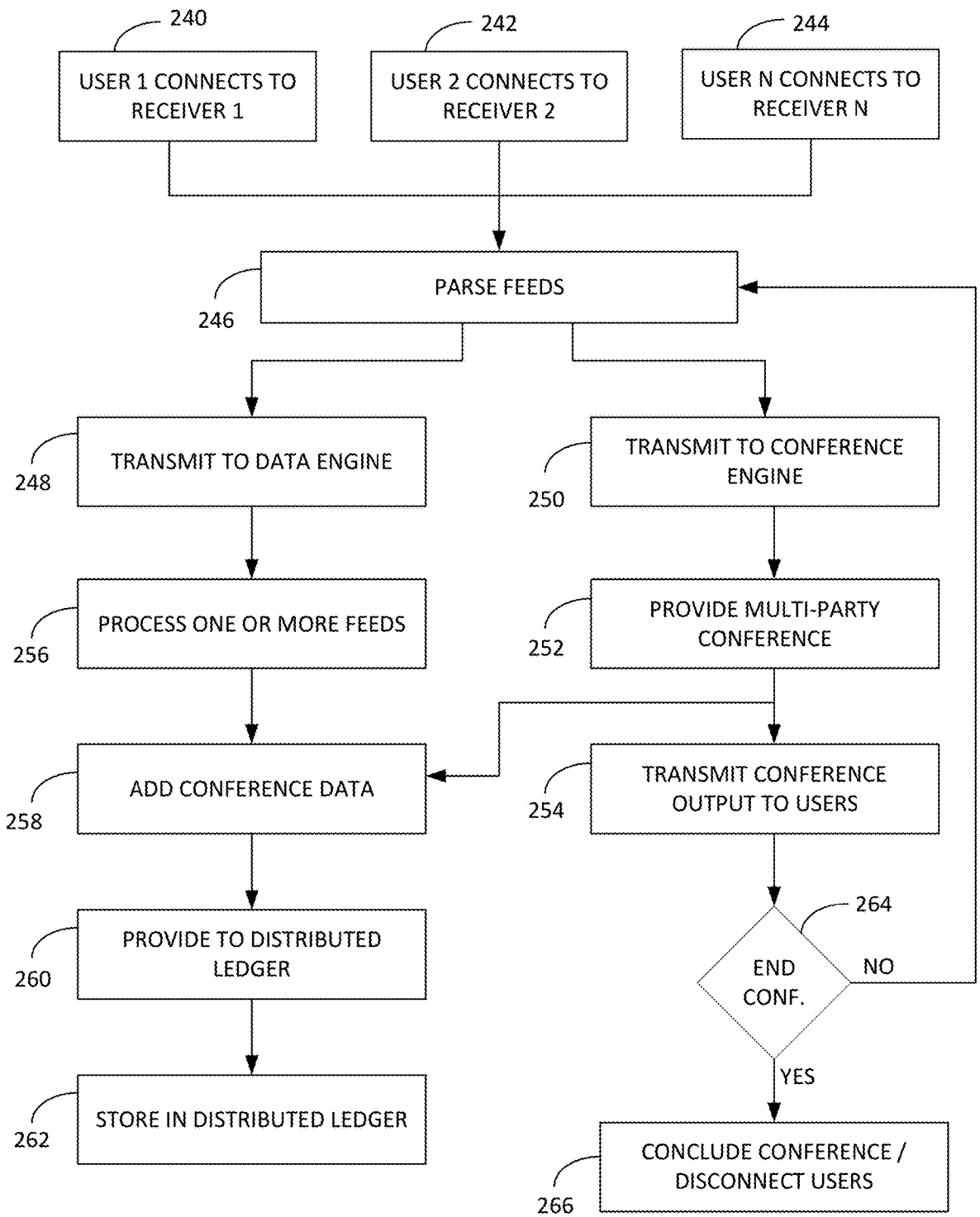
FIG. 7 illustrates a flowchart of the steps of another embodiment of a method for content management in a multi-party communication system.

FIG. 6 illustrates a flowchart of steps of one embodiment of content management with a conferencing system. The methodology may be performed within the system 100 of FIG. 1. This method illustrates relative to a single user engaging a platform, where FIG. 7 illustrates multiple users.

Step 200 is user engagement of a communication platform. This may be using any suitable connection technique, for example but not limited to accessing a web portal having multi-party communication features, dialing into a direct dial conference system, engaging an app executing on a mobile device, etc.

Step 202 is a decision if the conference is to begin. Typically, additional users are connecting to the platform before (and during) the conference. A typical system uses a conference leader to manage the conference. In other embodiments, the conference may be on an open channel allowing for users to enter and exit the channel. Therefore, the methodology does not require an explicit beginning to a conference, rather step 202 indicates a general beginning point for the conference.

The communication platform receives a user engagement stream, step 204. The user engagement stream includes one or more content feeds, such as an audio feed, a video feed, and a data feed. For example, in FIG. 1, the receiver 114 receives the user engagement stream. If the user engages via a dial-up or audio connection, the audio feed may be the only feed. If the user engages via a computing device with a microphone and camera, the feeds may include video feed, audio feed, and possibly a data feed.

Herein, the method concurrently sends the feeds to the conference engine (step 206) and data engine (step 208). In the conference engine, the method includes conducting the multi-party conference, step 210.

As the conference is being conducted, step 212 is generating conference data. The conference data is data relating to the conference itself. For example, conference data may include timing data indicating a timeline of the conference. Conference data may include a record of which parties are contributing audio, video, data, etc., e.g. a log of which parties are actively talking at what time.

The conference data may include additional data acquired from the conference using additional processing engines. For example, one embodiment may include a voice to text conversion engine that can generate a dictation of parts or all of the conference. The conference data may include the generated text. For example, another embodiment may be a shared editing program allowing for parties to make changes to a document. The conference data may include versioning information of the document. Conference data can also include text or chat data generated by parties using the platform itself.

Users may provide recordation instructions to the conference engine. For example, one embodiment may include an interface with a record button or audio instruction allowing a party to instruct the data engine to begin recording. Recordation may be one feed, selective feeds or all feeds. Further example, selective recordation may include recording the audio for specific participants and a data feed for a shared online document.

Step 214 includes the inquiry if there is a storage notification. If yes, the conference engine generates a store command and provides the command to the data engine. The data engine is to process and store the feed(s), step 216. It is noted that in one embodiment, the recordation of the feed(s) may be automated and not dependent upon conference data instructions. Moreover, recordation may include such just the feeds, and may also include conference data if requested. The feeds for storage are received from the data engine, in step 208.

Relative to steps 214 and steps 216, the further inquiry is if the conference is finished, step 218. If not, the method can revert back to step 204 for continued receipt of the conference feeds. It is understood that while shown in a step-wise flow diagram, the methodology is a continuous processing of feed(s) during multi-party conferences. The user generates continuous incoming data feed(s) engaging in the conference, the conference engine generates continuous output feeds back to the user and the data engine can be continuously processing the data feeds for storage.

FIG. 7 illustrates a multi-party flow diagram for multiple parties engaging in the conferencing system. Steps 240, 242 and 244 provide for users connecting to receivers. In step 244, the letter N represents any suitable integer. The receivers may be the receivers within the communication platform 112 of FIG. 1. The communication system includes specific receivers for each user providing connectivity prior to the conference engine. The receivers are operative to parse the feeds, step 246.

Similar to FIG. 6, the methodology concurrently performs multi-party conferencing and data processing for recordation. The parsed feeds include one or more of the types of information from the conference, including for example but not limited to an audio feed, a video feed and a data feed. The method includes transmitting the feeds to the data engine, step 248, and to the conference engine, step 250.

Within the conference engine, the method includes providing the multi-party conference. This conference operates as discussed above, enabling multiple parties to communicate across the shared platform. As part thereof, step 254 is transmitting conference output to the users. For example, if the conference is a video and audio conference, where user 1 is speaking, the conference output for user 1 may be the video input from user 2 with no audio output, e.g. user 1 sees user 2 on the screen. Similarly, the output for user 2 would be the user 1 audio and video input feeds. The communication engine repeats steps 252, 254 as the conference progresses, often times changing the conference output as necessary. For example, when user 2 begins to speak, user 1 receives the output of user 2 video and audio.

Concurrent with the conference engine, the data engine processes the feeds, step 256. Processing the feeds may include filtering out content, adding meta data or other identifiers, or other operations. The processing includes step 258 which is adding conference data. In one embodiment, conference data may be received from the multi-party conference operations in step 252.

In this embodiment, the data engine then provides processed data to a distributed ledger system, step 260, in response to the store command. With reference to FIG. 1, this step may be done using the external data engine 122 and the distributed ledger system of FIG. 5. Step 262 provides for storing the data in the distributed ledger. For example, using a block chain storage system may include validation of a data block storing the data therein, including a hash sequence referencing a prior block. The data storage may include encryption using a key structure for data privacy.

The distributed ledger may be a distributed ledger associated with the communication platform. For example, the ledger may include a chain of blocks each storing conferencing data from multiple feeds from multiple conferences. In another embodiment, the distributed ledger may be a third-party ledger system allowing for data storage thereon, where the blocks in the chain of blocks include all types of data storage from any number of different systems.

In the conferencing methodology, the conference continues, steps 252, 254 until the conference is terminated, step 264. For example, one embodiment may include a conference leader terminating the conference. Therefore, when terminated, step 266 is to conclude the conference and disconnect users. While not terminated, step 266, the method includes reversion back to step 246 for continued parsing of feeds in the user engagement streams.

The above figures and description provide for generation of data and content stored during the multi-party conference. Whereas further embodiments provide for accessing and playback of the conference data. As the present method and system stores conference data and feeds independently, playback and content verification can be performed not only on the full conference itself, but specific aspects or feeds.

A user interface enabled within the conference engine 118 allows for a user, such as user 102, to later access the conference engine 118 and retrieve data for a multi-party conference via the data engine 120. As noted above, the utilization of authentication data further verifies the authenticity of the stored data retrieved by the data engine 120.

Using the example of the first user 102 accessing the conference engine 118 via computer 104, the first user 102 can then select a particular conference for retrieval via the data engine 120. Via this user interface, the first user 102 can then recreate the conference itself from any number of perspectives. For example, if the conference had three users (user A, user B, and user C), the playback could be selected to recreate the conference from the perspective of user C. This embodiment would then use the stored content feeds as well as the conference data for recreation. For example, if user C has minimized a display window, this would be captured in the conference data to show that user C did not view a visual display during the recreation. For example, if user C had muted the output volume, the recreation could establish that user C did not hear a particular portion of the call. Similarly, if user C had an active output volume, but user B had inadvertently muted his microphone, the recreation would establish that user C was never able to hear a particular portion of the call.

As part of the user interface, the user 102 could therein manage or annotate the replay to generate new conference data. For example, the user 102 may be able to select a portion of a conference call, such as a particular conversation within a larger conference. The user 102 could also generate the conference data from multiple different perspectives. In the example of users A-C, the perspective could be from all three users, the perspective of user A and B, etc. Moreover, the conference data could isolate feed or feeds for designated users. In the example of user A giving a slide presentation, the conference data may select the audio feed for user A as the spoken audio content and the video feed for users B and C to illustrate viewing of the slide content.

As part of the user interface, the user 102 could also annotate or add later information to the multi-party conference. Such later-added information is appropriately designated as being added data, to insure the authenticity of the original content. By way of example, if multi-party conference was a team building call, a manager may review the conference and provide feedback to the event or to the participants. In another example, if the multi-party conference is a contract negotiation, one party may later include notes usable for evidentiary support or contract drafting. In another example, if the conference call is a workplace safety demonstration or a company policy presentation, a supervisor can later review and annotate the conference data for verification of employ attendance.

Unlike prior art conferencing systems, the present method and system isolates feeds and uses conference data enabling a large variety of in-conference functionalities and post-conference functionalities. These functionalities can also operate from any available perspective, from the general perspective of the user or a perspective as to a specific feed. The recordation and authentication further allows long-term reliability and re-usability of the conference data enabling and easing use of recording technology for validation of statements made and heard by different users in oral communication.

The present method and system also allows for additional functionalities to supplement the conferencing technology. Inclusion of additional technologies allows for multiple types of multi-party communication with recordation and management of content within the user engagement streams. For example, two parties may engage in negotiations using the platform, with an audio recordation of the negotiations. A speech to text translator may allow generation of a written contract visible by both parties as a supplement to any oral agreement. Using an interface, parties could attach assent notifications or signatures to the agreement, such as generating a signature on a touch-screen, entering a unique identifier on a keypad, video recordation of the party verbally agreeing, etc. The negotiations and subsequent agreement can then be duly noted and recorded in database for posterity. One embodiment includes using a block chain system for recordation granting authenticity verification of the agreement, negotiations, each party's interactions, consent and general agreement formation. All validation and recordation can be done concurrent with the actual negotiations using the system and methods described herein.

In this exemplary embodiment, the user interface for reviewing or replaying the conference can allow for additional authentication of the oral negotiations and the verbal agreement. For example, if the contract is between a buyer and a seller, and the buyer later denies having heard a contract term during negotiations, a mediator or adjudicator may replay the video conference from the perspective of a buyer to fully understand exactly what audio the buyer was exposed to during the conference call. Similarly, through the user interface, the seller could access the stored conference data and feeds to generate a recording of the conference from the buyer's perspective as evidence of the negotiations.

In another exemplary technique, a user may present a lecture using the communication platform. The presenter enters as a moderator having sole audio and video control for presentation. The presenter may also include a data feed of slides being presented. The system may connect the presenter with any number of listeners. While the lecture is being presented, the system may record the presentation, including audio feed, video feed, and/or data feed. Similarly, various listeners must certify attendance, the system can receive one or more user engagement streams verifying the user is watching and/or listening to the lecture. Verification of attendance can be noted by recordation of one or more feeds, such as a user text feed for receipt of a timely verification code, such as a screen-capture of the user's output display to illustrate the content is being viewed, and/or a video capture to show the user is present and watching the screen.

In the example of the user interface, the presenter could later access the audio feed and video feed to review the presentation. The presenter could record the audio feed and video feed and maybe edit out questions or interruptions. Similarly, the presenter may edit a recording to intersperse an audio track from a viewer presenting a question with the video feed from the presenter, etc.

In another example, the conferencing method and system can be used to record and verify the authenticity of a statement, such as a deposition. The system may use ancillary software to provide audio to text translation and generate a transcript. Users can interact across the platform with questions and answers, the independent feeds being individually recorded and authentication via a distributed network storage network.

Where the above embodiments provide for recordation of content, one embodiment may include prevention or disabling of recordation. For example, one party may enable an off-the-record button or other interface selection that prohibits recordation. In this embodiment, the conference engine can be disabled from transmitting a store command to the data engine. In another embodiment, the store command may be modified to exclude any content streams from the user enabling the recording disable request.

As such, the present method and system improves upon prior conferencing systems by allowing for one or more content streams to be recorded. The one-to-one connection of the users to receivers and parsing out of the user engagement streams prior to the conference engine allows for data engine operations as described herein.

Figures presented herein are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, Applicant does not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein.

What is claimed is:

1. A method for content management with a conferencing system, the conferencing system facilitating a conference between a first user and a second user, the method comprising:
    receiving a first user engagement stream in a first receiver and a second user engagement stream in a second receiver;
    generating a first parsed user engagement stream by parsing the first user engagement stream and a second parsed user engagement stream by parsing the second user engagement stream;
    transmitting the first parsed user engagement stream and the second parsed user engagement stream to a conference engine;
    transmitting the first parsed user engagement stream and the second parsed user engagement stream to a data engine;
    facilitating a multi-party conference including the first user and second user using the conference engine; and
    storing at least a portion of at least one of: the parsed first user engagement stream and the parsed second user engagement stream.

2. The method of claim 1 further comprising:
    generating a store command based on the multi-party conference, the store command including an instruction to store the at least a portion of at least one of: the parsed first user engagement stream and the parsed second user engagement stream; and
    transmitting the store command to the data engine, wherein the storing is performed in response to the store command.

3. The method of claim 2, wherein the storing, in response to the store command, is in a local storage device.

4. The method of claim 2, wherein storing, in response to the store command, is in a network-based distributed ledger storage system.

5. The method of claim 1 further comprising:
    receiving first user identity verification data and second user identity verification data; and
    associating the first user identity verification data and the second user identity verification with the storing using the network-based distributed ledger storage system.

6. The method of claim 1 further comprising:
    generating conference data in the conference engine during facilitation of the multi-party conference; and
    storing the conference data.

7. The method of claim 6, wherein the conference data is stored in conjunction with the at least a portion of at least one of: the parsed first user engagement stream and the parsed second user engagement stream.

8. The method of claim 1, wherein the first user engagement stream includes at least one of: a first video stream, a first audio stream, and a first data stream and the second user engagement stream includes at least one of: a second video stream, a second audio stream, and a second data stream.

* * * * *